United States Patent
Tomita et al.

(10) Patent No.: US 7,551,369 B2
(45) Date of Patent: Jun. 23, 2009

(54) LENS BARREL AND OPTICAL APPARATUS

(75) Inventors: Chifuyu Tomita, Yokohama (JP);
Hiroyoshi Inaba, Utsunomiya (JP);
Youichi Iwasaki, Utsunomiya (JP);
Tomoki Hasegawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

(21) Appl. No.: 11/961,619

(22) Filed: Dec. 20, 2007

(65) Prior Publication Data

US 2008/0158692 A1    Jul. 3, 2008

(30) Foreign Application Priority Data

Dec. 27, 2006    (JP)    ............................. 2006-351096

(51) Int. Cl.
*G02B 15/14*    (2006.01)
(52) U.S. Cl. .................... 359/704; 359/703; 359/819
(58) Field of Classification Search ............... 359/704, 359/703, 819, 821, 822, 823, 826
See application file for complete search history.

(56) References Cited

U.S. PATENT DOCUMENTS

2008/0158692 A1*    7/2008    Tomita et al. ............... 359/698

* cited by examiner

*Primary Examiner*—Timothy J Thompson
(74) *Attorney, Agent, or Firm*—Cowan, Liebowitz & Latman, P.C.

(57) ABSTRACT

A lens barrel includes: first and second movable lens units; first and second drive sources for moving the first and second movable lens units in a direction parallel to an optical axis, respectively; guide members for each retaining the first and second movable lens units and for guiding movements of the first and second movable lens units; and a reference position detector for detecting reference positions for the first and second movable lens units, in which: the reference position detector has light emitting receiving elements; the first and second movable lens units have sleeves each engaged with the guide members and have light blocking portions for detecting the reference positions by the light emitting and receiving elements of the reference position detector; and the first and second lens units can move in the optical axis direction, with their respective light blocking portions passing each other without any interference.

10 Claims, 7 Drawing Sheets

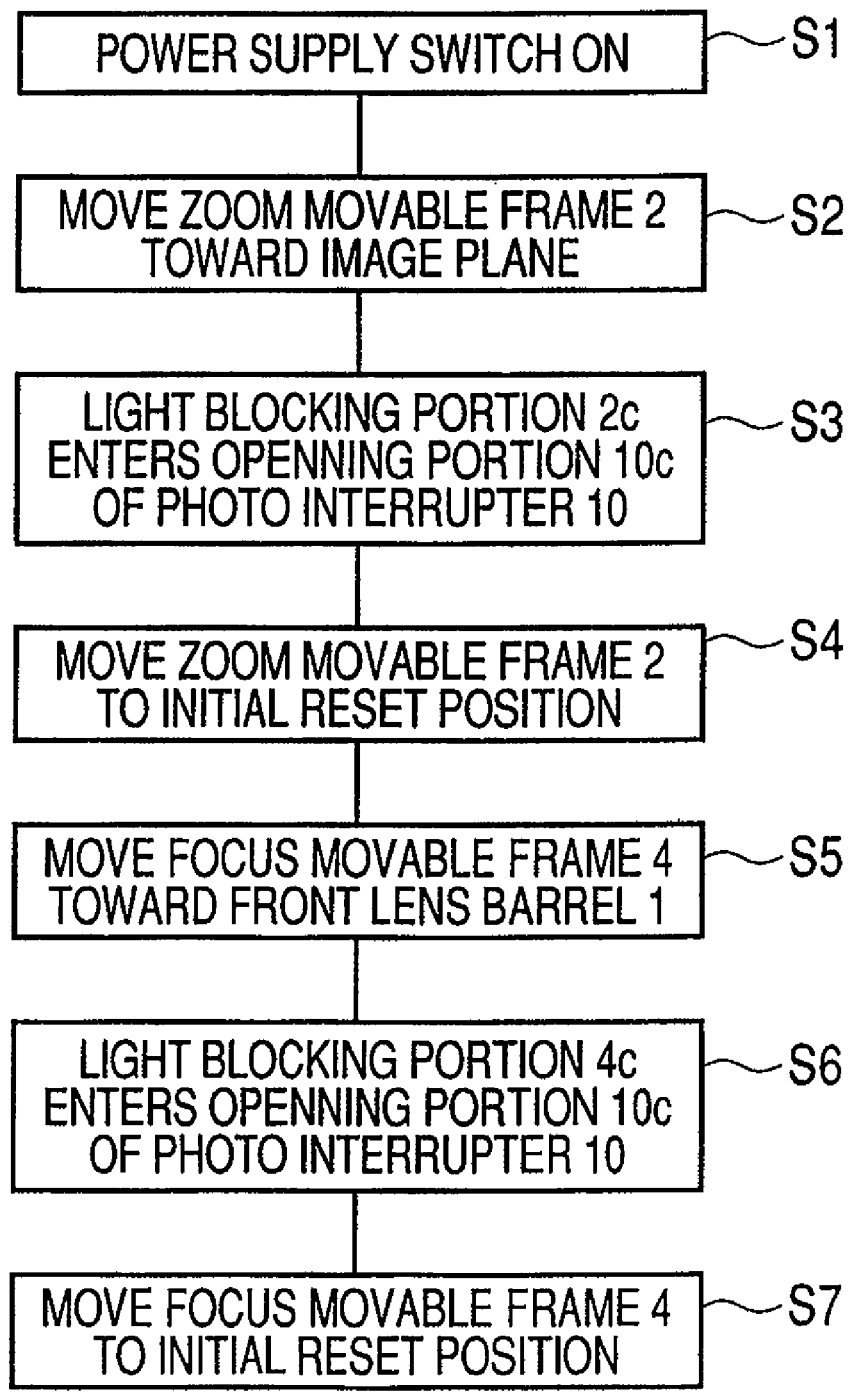

LENS BARREL AND OPTICAL APPARATUS

BACKGROUND OF THE INVENTION

1. Field of the Invention

The present invention relates to a lens barrel and an optical apparatus allowing detection of a reference position of movable lens units.

2. Description of the Related Art

Conventionally, a lens barrel of a type in which a zoom lens unit and a focus lens unit in the lens barrel are driven by a drive unit such as a stepping motor has been known as a still camera lens barrel or a video camera lens barrel.

Generally speaking, when driving a movable lens unit by a stepping motor or the like, an open-loop control system is often adopted as the control system for the driving and positioning of the lens unit. The open-loop control system has advantages in that it is not necessary to provide a detector for detecting the position of the movable lens unit at each moment and in that the construction of the control system can be configured simpler and smaller than that of a closed-loop type control system.

However, when performing positioning control on a movable lens unit by an open-loop control system using a stepping motor, it is necessary to reset the movable lens unit to a reference position prior to starting of the positioning control in order to match the drive start position with the drive start position for the movable lens unit. Thus, it is necessary to provide for each movable lens unit a reference position detector for detecting whether or not each of the movable lens units has been set at a reset position, which is the reference position. Further, for conducting highly accurate detection of the reference position, it is ideal to arrange a light blocking portion, which is to be inserted into an opening portion of the reference position detector described below, in the periphery of a sleeve provided in a lens barrel relatively free from play.

In order to achieve a downsizing of the lens barrel, Japanese Patent Application Laid-Open No. 2002-341226 proposes a lens barrel in which, a single reference position detector detects the respective reference positions of the zoom lens unit and the focus lens unit.

In the lens barrel as disclosed in Japanese Patent Application Laid-Open No. 2002-341226, in which multiple movable lens units share a guide bar, the moving amount of the movable lens units in the optical axis direction may be large, that is, the zoom ratio may be large. In this case, it is necessary to secure a region where the movable lens units do not interfere with each other and a sleeve length required from the mechanical viewpoint for inserting the guide bar.

However, arranging the light blocking portion and the reference position detector in the periphery of the sleeve of each movable lens unit results in a rather large total length of the lens barrel, thus hindering a downsizing of the lens barrel as a whole. On the other hand, when, the reference position detector and the light blocking portion are arranged at positions away from the sleeve in order to avoid an increase in the size of the lens barrel, the positional deviation of the light blocking portion with respect to sleeve play increases, resulting in a deterioration in the precision with which the reference position detection for the movable lens units is effected.

SUMMARY OF THE INVENTION

The present invention provides a lens barrel and an optical apparatus in which a zoom lens unit and a focus lens unit share the same reference position detector and which provide high accuracy in reference position detection and help to avoid an increase in size.

An aspect of the present invention relates to a lens barrel including: a first movable lens unit; a first drive source for moving the first movable lens unit in a direction parallel to an optical axis; a second movable lens unit; a second drive source for moving the second movable lens unit in a direction parallel to the optical axis; guide members for each retaining the first and second movable lens units and for guiding movements of the first and second movable lens units; and a reference position detector for detecting reference positions for the first and second movable lens units, in which: the reference position detector has a light emitting element and a light receiving element; the first and second movable lens units have sleeves each engaged with the guide members and have light blocking portions for detecting the reference positions by the light emitting element and the light receiving element of the reference position detector; and the first and second lens units can move in the optical axis direction, with their respective light blocking portions passing each other without any interference.

Further features of the present invention will become apparent from the following description of exemplary embodiments with reference to the attached drawings.

BRIEF DESCRIPTION OF THE DRAWINGS

FIG. 7 is an operational flowchart.

DESCRIPTION OF THE EMBODIMENTS

In the following, embodiments of the present invention will be described with reference to the drawings.

Embodiment 1

Figure 1:
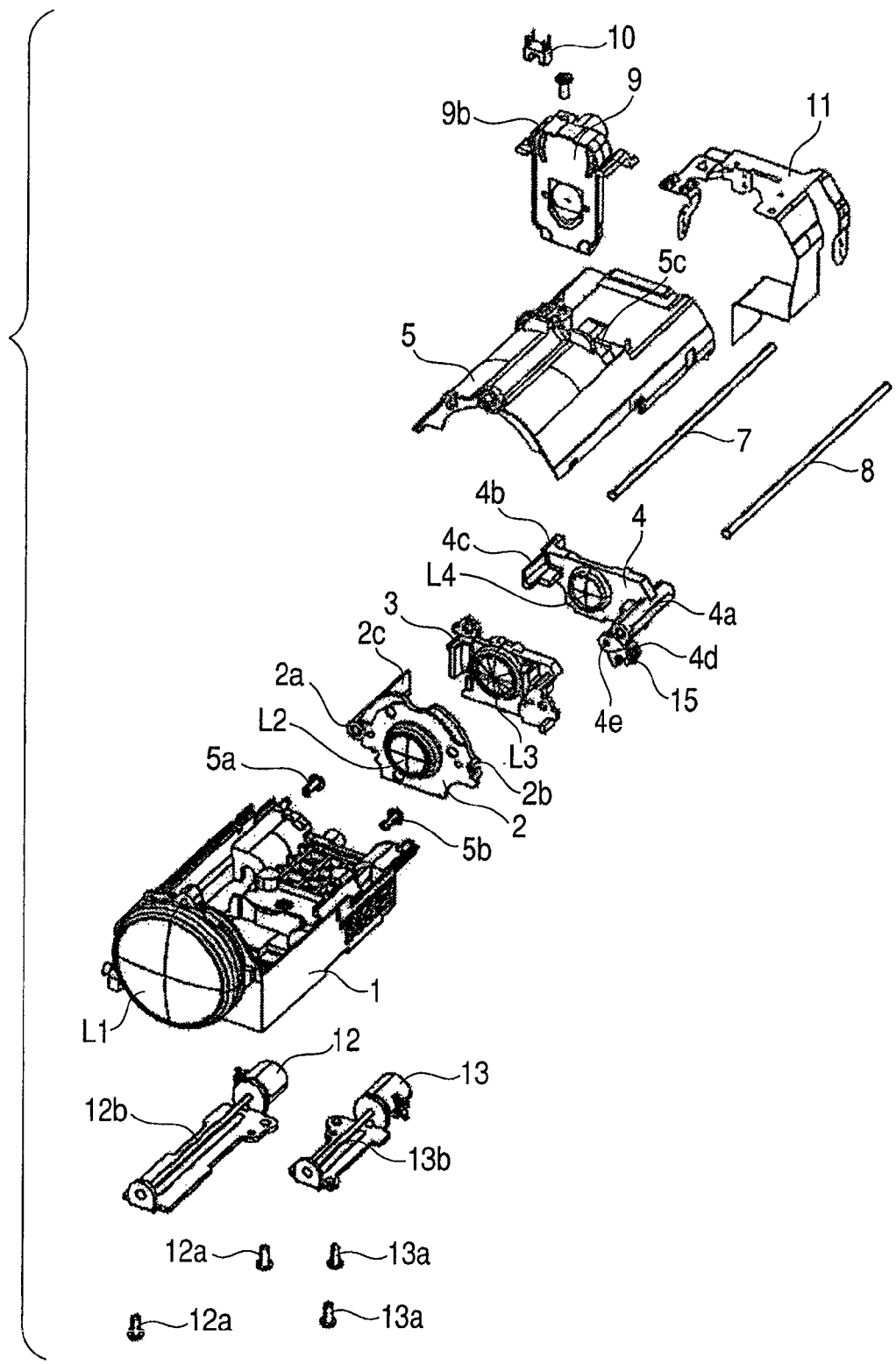
FIG. 1 is an exploded perspective view of a lens barrel according to an embodiment.
Figure 2:
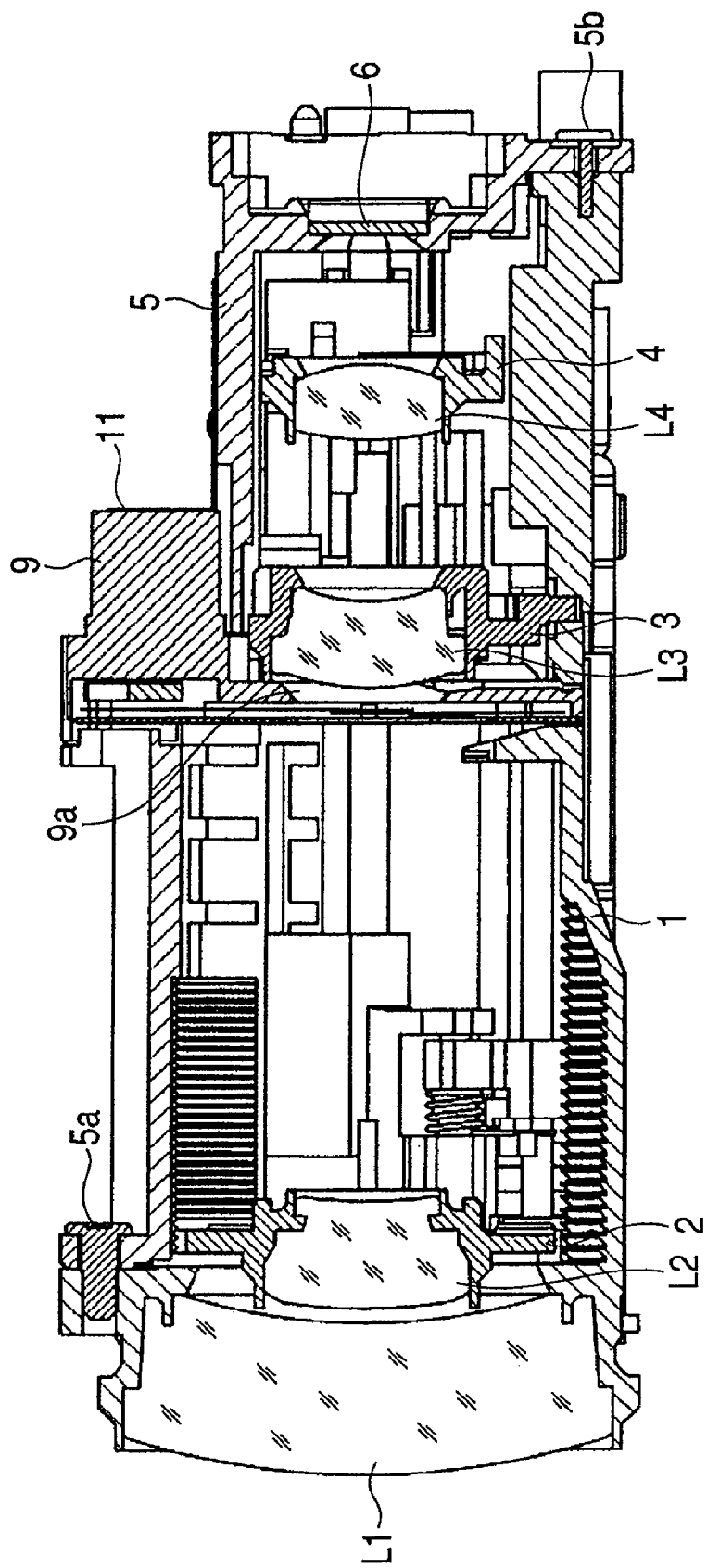
FIG. 2 is a longitudinal sectional view of the same.
Figure 3:
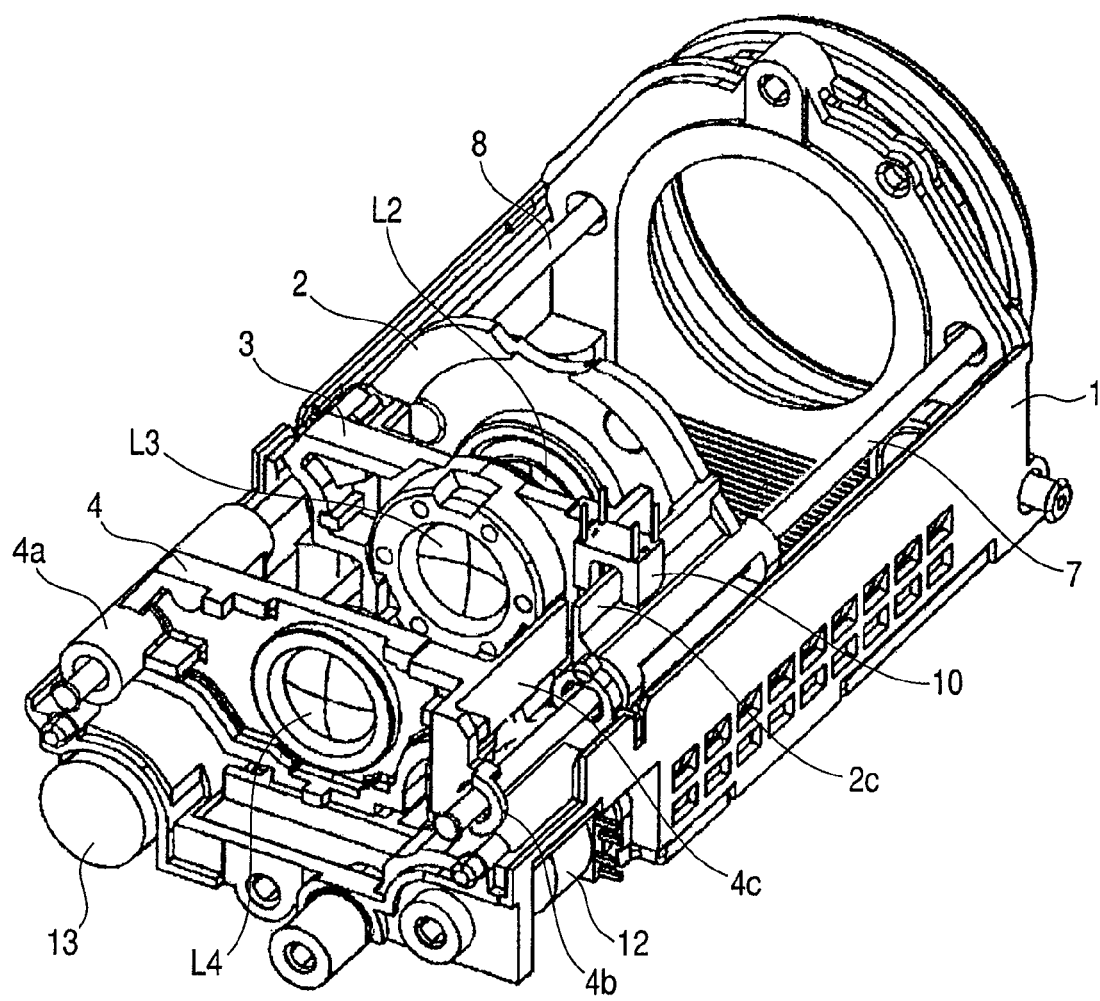
FIG. 3 is a perspective view, as seen from the image plane side, of the internal construction of the lens barrel.
Figure 4:
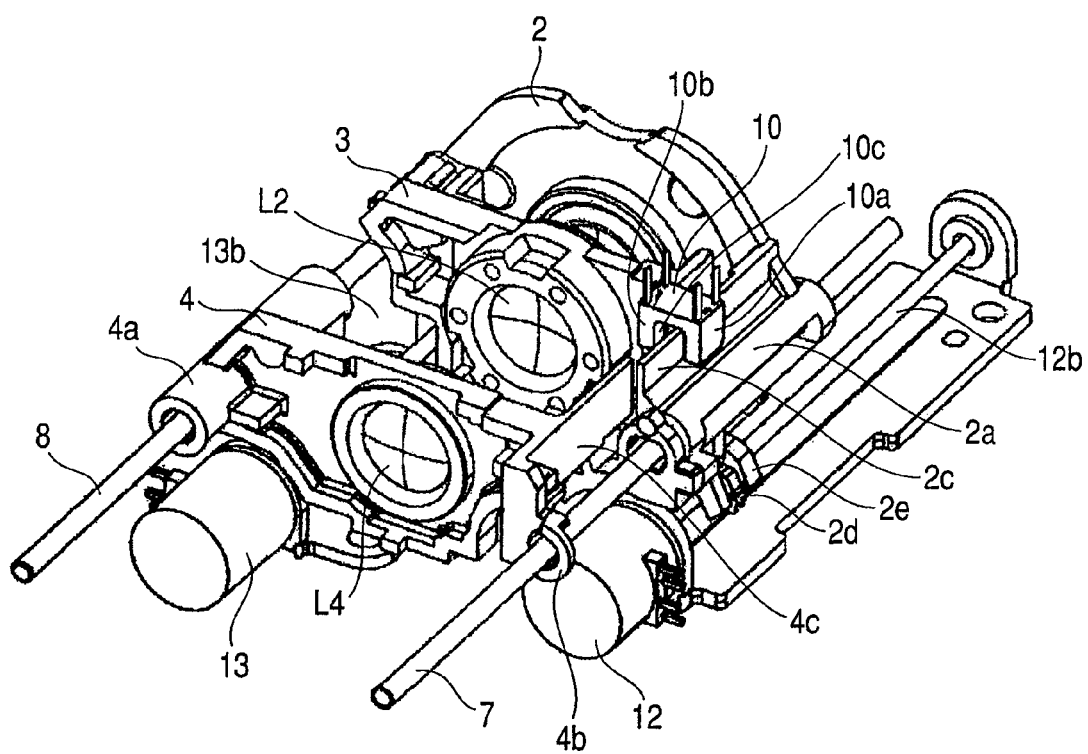
FIG. 4 is a perspective view, as seen from the image plane side, of the internal construction of the lens barrel.

FIG. 1 is an exploded perspective view of a lens barrel having a zoom optical system including four lens units of a positive lens unit, a negative lens unit, another positive lens unit, and still another positive lens unit, FIG. 2 is a longitudinal sectional view of the same, and FIGS. 3 and 4 are perspective views, as seen from the image plane side, of the internal construction of the lens barrel.

In the optical axis direction of the lens barrel, the lens units are arranged as follows: a first lens unit L1 which is stationary and positive, a second lens unit L2 which performs zooming operation by moving in the optical axis direction and which is negative, a third lens unit L3 which is stationary and positive, and a fourth lens unit L4 which performs focusing operation by moving in the optical axis direction and which is positive. Further, the first lens unit L1, the second lens unit L2, the third lens unit L3, and the fourth lens unit L4 are retained by a front lens barrel 1, a zoom movable frame 2, a 3-unit lens barrel 3, and a focus movable frame 4, respectively.

Here, the second lens unit L2 and the zoom movable frame 2 are integrated with each other to form one movable lens unit, and the fourth lens unit L4 and the focus movable frame 4 are integrated with each other to form the other movable lens unit. Further, a CCD holder 5 is arranged around the zoom movable frame 2, the 3-unit lens barrel 3, and the focus movable frame 4 and over the front lens barrel 1, and an image pickup element 6 such as a CCD or a CMOS is fixed to the CCD holder 5. The CCD holder 5 is connected to the front lens barrel 1 from behind by two screws 5a and 5b.

The both ends of guide bars 7 and 8 serving as guide devices are retained by the front lens barrel 1 and the CCD holder 5, and the zoom movable frame 2 and the focus movable frame 4 are engaged with the guide bars 7 and 8 so as to be slidable in the optical axis direction. The zoom movable frame 2 has a sleeve 2a of a specific length, a U-shaped groove portion 2b, and a plate-like light blocking portion 2c. The focus movable frame 4 has a sleeve 4a of a specific length, a U-shaped groove portion 4b, and a light blocking portion 4c. Each of the zoom movable frame 2 and the focus movable frame 4 is fit-engaged with one of the guide bars through the intermediation of the sleeve 2a, 4a extending in the optical axis direction. Thus, each movable frame is prevented from tilting in the optical axis direction, and is prevented from rotating through engagement of the U-shaped groove portion 2b, 4b with the other guide bar. Note that, in the zoom movable frame 2, the light blocking portion 2c is formed integrally with the sleeve 2a, and in the focus movable frame 4, the light blocking portion 4c is provided on the U-shaped groove portion 4b side.

A guillotine type light amount adjusting unit 9 which varies the aperture diameter of the optical system by moving two blades in opposite directions is incorporated into an opening portion 5c provided in a part of the CCD holder 5. The light amount adjusting unit 9 is arranged between the zoom movable frame 2 and the 3-unit lens barrel 3, and has, in addition to the two blades, a stationary stop 9a formed by a stationary wall for restricting incident light.

A photo interrupter 10, which is a reference position detector, is attached to the light amount adjusting unit 9. The photo interrupter 10 is formed in a U-shaped configuration having an opening portion 10c formed between a detection end portion 10a and a detection end portion 10b, and a light receiving element is attached to the inner side surface of the detection end portion 10a, and a light emitting element is attached to the inner side surface of the detection end portion 10b. After being press-fitted and fixed into the opening portion 5c provided in the CCD holder 5, the photo interrupter 10 is pressed by a presser portion 9b provided on the light amount adjusting unit 9 to be fixed in position so as not to be detached from the opening portion 5c by an impact or the like.

The light emitting element and the light receiving element are electrically connected to a controller on an electric circuit board through electric wiring. The light receiving element may receive light other than the light emitted from the light emitting element to thereby cause a malfunction, so in this embodiment, the photo interrupter 10 is arranged on the image plane side with respect to the stationary stop portion 9a of the light amount adjusting unit 9, thereby mitigating the influence of the light entering from the object side.

Before assembly, a flexible printed circuit (FPC) 11 is soldered to the light amount adjusting unit 9, and after being incorporated together with the light amount adjusting unit 9, the flexible printed circuit (FPC) 11 is soldered to the photo interrupter 10 and a stepping motor described below incorporated beforehand.

The zoom movable frame 2 equipped with the second lens unit L2 is driven in the optical axis direction by a zoom motor 12 consisting of a stepping motor to effect zooming operation. The focus movable frame 4 equipped with the fourth lens unit L4 is driven in the optical axis direction by a focus motor 13 consisting of a stepping motor to effect focusing operation. The zoom motor 12 and the focus motor 13 are fixed to the front lens barrel 1 each by two screws 12a and 13a.

The zoom motor 12 and the focus motor 13 each have lead screws 12b and 13b as rotation shafts; in the state in which the zoom motor 12 and the focus motor 13 have been incorporated into the front lens barrel 1, the lead screws 12b and 13b are arranged parallel to the optical axis. Racks 2d and 4d threadedly engaged each with the lead screws 12b and 13b are attached to connecting portions 2e and 4e of the movable frames 2 and 4 so as to be swingable in a direction perpendicular to the optical axis. Further, the forward end portion of each of the racks 2d and 4d is formed in a forked configuration, and is equipped with a main teeth, opposing teeth, and pressurizing teeth, with the main teeth being threadedly engaged with a feed screw of the lead screw 12b, 13b. Through rotation of the lead screws 12b and 13b, the zoom movable frame 2 and the focus movable frame 4 are driven in the optical axis direction via the racks 2d and 4d.

Figure 5:
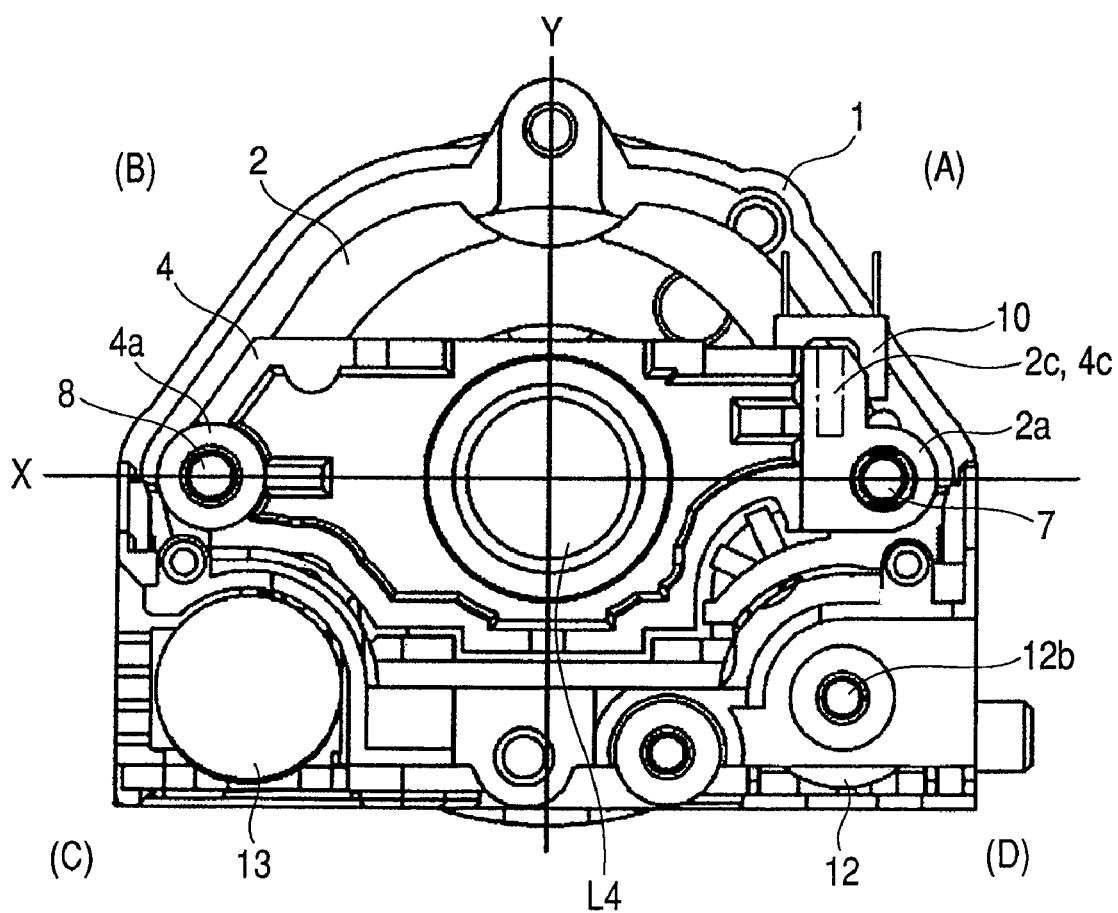
FIG. 5 is an explanatory view, as seen from the image plane side, illustrating how the components of the lens barrel are arranged.

FIG. 5 is an explanatory view illustrating the arrangement relationships between the photo interrupter 10 and the light blocking portion 2c of the zoom movable frame 2, and the light blocking portion 4c of the focus movable frame 4. In order from the image plane side, there are arranged the front lens barrel 1, the zoom movable frame 2, the focus movable frame 4, the guide bars 7 and 8, the photo interrupter 10, the zoom motor 12, and the focus motor 13.

As shown in FIG. 5, a horizontal segment X connecting the sleeves 2a and 4a of the zoom movable frame 2 and the focus movable frame 4 and the optical axis and a vertical segment Y perpendicular to the horizontal segment X divide the whole into four regions, which are referred to as first through fourth quadrants (A) through (D). In this embodiment, the photo interrupter 10 is arranged in the quadrant (A), the sleeve 2a of the zoom movable frame 2 is arranged in the quadrants (A+D), the sleeve 4a of the focus movable frame 4 is arranged in the quadrants (B+C), and the light blocking portion 2c and the light blocking portion 4c are arranged in the quadrant (A).

As stated above, the light blocking portion 2c provided on the zoom movable frame 2 is formed integrally with the sleeve 2a, and is arranged in the quadrant (A) like the photo interrupter 10. On the other hand, the light blocking portion 4c provided on the focus movable frame 4 is arranged in the quadrant (A) like the light blocking portion 2c, whereas the sleeve 4a is arranged in the quadrants (B+C) on the opposite side with respect to the optical axis.

In this way, the photo interrupter 10 electrically detects switching between light blocking and light transmission states due to the movement in the optical axis direction of the light blocking portions 2c and 4c provided on the zoom movable frame 2 and the focus movable frame 4, thereby determining the reference positions of the second lens unit L2 and the fourth lens unit L4. According to this principle, supposing the positions of the light blocking portions 2c and 4c are deviated due to play of the zoom movable frame 2 and the focus movable frame 4, deviation from the reference positions determined based on design values occurs, so the detection accuracy may deteriorate.

Here, supposing that a focus sensitivity is defined as the ratio of the displacement of the image forming plane when the second and fourth lens units L2 and L4 move in the optical axis direction by a unit length, e.g., 1 mm, the focus sensitivity of the second lens unit L2 is higher than that of the fourth lens unit L4, in the optical system of this embodiment. That is, the influence of the positional deviation in the optical axis direction of the movable lens unit L2, L4 on the image plane deviation is greater in the case of the second lens unit L2, which is of a higher focus sensitivity.

In view of this, in this embodiment, the light blocking portion 2c is formed integrally with the sleeve 2a of the zoom movable frame 2 to thereby mitigate the influence of the play between the sleeve 2a and the guide bar 7 on the positional deviation of the light blocking portion 2c. In this way, the light blocking portion of the movable lens unit having of a higher focus sensitivity, which is the ratio of the positional deviation of the image plane with respect to the positional deviation in the optical axis direction, is arranged in the periphery of the sleeve of the movable lens frame on a priority basis, whereby it is possible to mitigate the positional deviation of the light blocking portion.

That is, in a plane perpendicular to the optical axis, the photo interrupter 10, which is the reference position detector, is arranged at a position nearer to the sleeve 2a of the second lens unit L2 (the focus lens unit), which is of a higher focus sensitivity than sleeve 4a of the fourth lens unit L4, which is of a lower focus sensitivity.

In this way, it is possible to minimize the influence of the positional deviation of the light blocking portion when the light from the light emitting element of the photo interrupter 10 is blocked, making it possible to diminish the positional deviation of the image plane.

In FIG. 5, the zoom motor 12 is arranged in the quadrant (D), that is, arranged within the range of the quadrant opposed to the photo interrupter 10 with respect to the horizontal segment X connecting the optical axis and the sleeve 2a. The rack 2d incorporated into the sleeve 2a of the zoom movable frame 2 is threadedly engaged with the lead screw 12b of the zoom motor 12. Thus, an attempt to arrange the photo interrupter 10 within the same quadrant (D) in order to arrange the photo interrupter 10 around the sleeve 2a results in an increase in the size of the diameter of the lens barrel.

To arrange the light blocking portion 2c and the photo interrupter 10 around the sleeve 2a or integrally with the sleeve 2a, the photo interrupter 10 may arrange within the range of the quadrant (A), which is opposed to the quadrant (D) with respect to the horizontal segment X connecting the sleeve 2a and the optical axis.

Thus, by adopting the arrangement of this embodiment, the light blocking portions 2c and 4c do not interfere with each other, and the accuracy with which the reference position detection is performed by the photo interrupter 10 does not deteriorate. Further, it is possible to minimize the arrangement layout of the zoom motor 12 and the sleeve 2a and that of the sleeve 2a, the light blocking portion 2c, and the photo interrupter 10, thereby contributing to a downsizing of the lens barrel.

Figure 6:
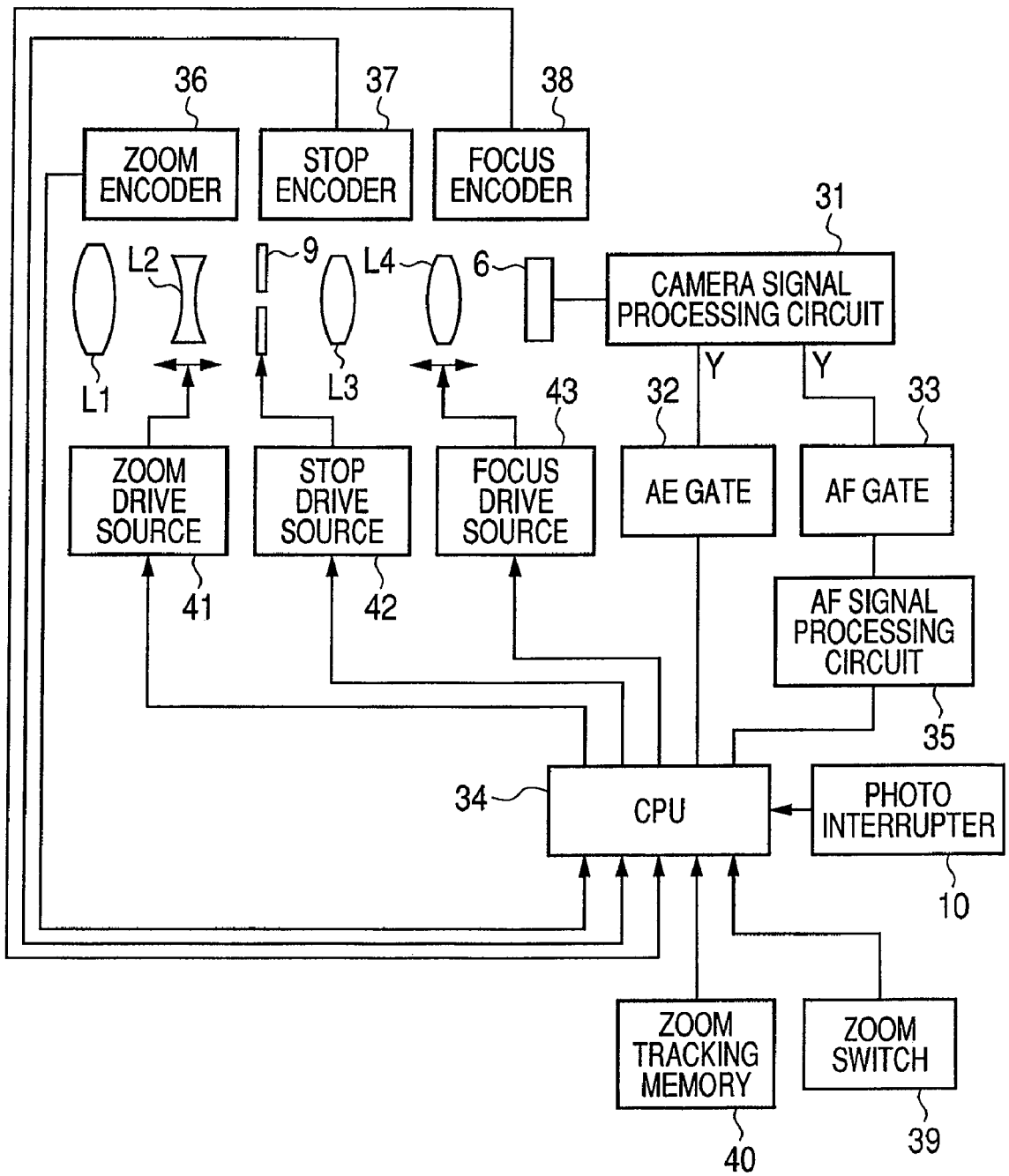
FIG. 6 is a block circuit diagram of an optical apparatus.

FIG. 6 is a block circuit diagram illustrating an optical apparatus, a typical example of which is the camera of this embodiment. The output of an image pickup element 6 receiving incident light passing the lens units L1 through L4 is connected to a camera signal processing circuit 31. A Y-signal of the output of the camera signal processing circuit 31 is connected to an AE gate 32 and an AF gate 33. The output of the AE gate 32 is connected to a CPU 34, and the output of the AF gate 33 is connected to the CPU 34 via an AF signal processing circuit 35.

Connected to the CPU 34 are the outputs of a zoom encoder 36 for detecting the position in the optical axis direction of the second lens unit L2, a stop encoder 37 for detecting the aperture diameter of the light amount adjusting unit 9, and a focus encoder 38 for detecting the position in the optical axis direction of the fourth lens unit L4. Further, connected to the CPU 34 are the outputs of the photo interrupter 10, a zoom switch 39, and a zoom tracking memory 40.

The output of the CPU 34 is connected to a zoom drive source 41, a stop drive source 42, and a focus drive source 43. The zoom drive source 41 includes the zoom motor 12, the lead screw 12b, and the like for driving the second lens unit L2, and the focus drive source 43 includes the focus motor 13, the lead screw 13b, and the like for driving the fourth lens unit L4.

The camera signal processing circuit 31 effects a specific amplification, gamma correction, etc. on the output of the image pickup element 6. A contrast signal of a video signal that has undergone such specific processing passes through the AE gate 32 and the AF gate 33. The AF signal processing circuit 35 for AF (auto focusing) produces one or multiple outputs related to the high frequency component of the video signal. The zoom switch 39 and the zoom tracking memory 40 stores information on the position of the focusing lens to be adjusted according to the distance to the subject and the position of the second lens unit L2 in performing zooming. Note that, it is possible to use memory in the CPU 34 as the zoom tracking memory 40.

For example, when the zoom switch 39 is operated by a photographer, the CPU 34 effects drive control so as to maintain a specific positional relationship of the second lens unit L2 and the fourth lens unit L4 calculated based on the information of the zoom tracking memory 40. That is, the zoom drive source 41 and the focus drive source 43 are drive-controlled such that the absolute position in the optical axis direction of the second lens unit L2 detected by the zoom encoder 36 and the calculated position coincide with each other. Similarly, the zoom drive source 41 and the focus drive source 43 are drive-controlled such that the absolute position in the optical axis direction of the fourth lens unit L4 detected be the focus encoder 38 and the calculated position coincide with each other.

In auto focus operation, the CPU 34 drive-controls the fourth lens unit L4 by the focus drive source 43 such that the output of the AF signal processing circuit 35 attains a peak.

Further, for proper exposure, the CPU 34 drive-controls the stop drive source 42 to control the aperture diameter of the light amount adjusting unit 9 such that a specific value of the average of the Y-signal outputs having passed the AE gate 32 and a specific value of the output of the stop encoder 37 are attained.

The zoom drive source 41 and the focus drive source 43 are not restricted to stepping motors as used in this embodiment. It is also possible to use a DC motor or a vibration motor. Further, it is also possible to adopt a detection system other than encoders to detect the positions of the second and the fourth lens units L2 and L4, respectively.

In the case in which stepping motors are used as the drive sources as in this embodiment, it is general practice to arrange lens movement frames at certain reference positions and then continuously count the number of operation pulses to be input to the stepping motors.

As the stop encoder 37, it is possible to use, for example, a system in which a Hall element is arranged inside a meter serving as a stop drive source arranged outside the lens barrel and in which the positional relationship in rotation between a rotor and a stator is detected. Two aperture blades are driven by the stop drive source 42 to perform light amount adjustment. ND filters are attached to the aperture blades in order not to deteriorate image quality due to diffraction caused by small-diameter stop. A system is also known in which the ND filters are driven by separate drive sources.

Further, in the above embodiment, one or both of the zoom drive source 41 for driving the second lens unit L2 and the focus drive source 43 for driving the fourth lens unit L4 may be formed by some other drive devices such as VCM.

Further, while in the above-mentioned embodiment the stationary wall of the light amount adjuster 9 constitutes the stationary stop 9a, this should not be construed restrictively. It is possible to adopt any other structure restricting the incident light from the object side, for example, a stationary wall in the form of a flange provided on the 3-unit lens barrel 3.

FIG. 7 is an operational flowchart illustrating an operation conducted when photographing is to be performed with a camera equipped with the lens barrel of this embodiment constructed as described above, with the reference positions of the movable lens units detected by the camera. In this embodiment, the reference position of the second lens unit L2 is detected first, and then the reference position of the fourth lens unit L4 is detected.

When the power source switch is turned on, the zoom motor 12 first starts to rotate (step S1), and the zoom movable frame 2 moves toward the image plane along the guide bars 7 and 8 through rotation of the lead screw 12b (step S2). Then, when the light blocking portion 2c enters the opening portion 10c formed by the detection end portion 10a and the detection end portion 10b of the photo interrupter 10, the light from the light emitting element is blocked by the light blocking portion 2c (step S3).

Here, the switched is turned on, and in response to this, the CPU 34 drives the zoom motor 12 while counting the number of steps to move the zoom movable frame 2 to the initial reset position (step S4). Next, the focus motor 13 rotates, and the focus movable frame 4 is moved toward the front lens barrel 1 (step S5); when the light blocking portion 4c enters the opening portion 10c of the photo interrupter 10 and blocks the light from the light emitting portion, the switch is turned on (step S6). In response to this, the CPU 34 drives the focus motor 13 while counting the number of steps and moves the focus movable frame 4 to the initial reset position (step S7).

The above-mentioned lens barrel is applicable to an optical apparatus, such as a 35 mm film camera, a digital still camera, or a digital video camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-351096, filed Dec. 27, 2006, which is hereby incorporated by reference herein in its entirety.

What is claimed is:

1. A lens barrel, comprising:
   a first movable lens unit;
   a first drive source for moving the first movable lens unit in a direction parallel to an optical axis;
   a second movable lens unit;
   a second drive source for moving the second movable lens unit in a direction parallel to the optical axis;
   guide members for each retaining the first and second movable lens units and for guiding movements of the first and second movable lens units; and
   a reference position detector for detecting reference positions for the first and second movable lens units,
   wherein the reference position detector has a light emitting element and a light receiving element,
   wherein the first and second movable lens units have sleeves each engaged with the guide members and have light blocking portions for detecting the reference positions by the light emitting element and the light receiving element of the reference position detector, and
   wherein the first and second lens units can move in the optical axis direction, with their respective light blocking portions passing each other without any interference.

2. A lens barrel according to claim 1, wherein, when, in a plane perpendicular to the optical axis, division into four quadrants is effected by a horizontal segment and a vertical segment passing the optical axis, the sleeve of the first movable lens unit and the sleeve of the second movable lens unit are arranged in different quadrants.

3. A lens barrel according to claim 1, further comprising a light amount adjuster for adjusting an amount of light from an object side, wherein the reference position detector is arranged on an image plane side with respect to the light amount adjuster.

4. A lens barrel according to claim 1, wherein the reference position detector is arranged in a quadrant opposed to a quadrant where the first drive source is arranged with respect to a horizontal segment connecting the sleeve of the first movable lens unit and the optical axis.

5. An optical apparatus, comprising:
   a lens barrel according to claim 1; and
   a camera equipped with an image pickup element for receiving light from the lens barrel.

6. A lens barrel, comprising:
   a first movable lens unit;
   a first drive source for moving the first movable lens unit in a direction parallel to an optical axis;
   a second movable lens unit;
   a second drive source for moving the second movable lens unit in a direction parallel to the optical axis;
   guide members for each retaining the first and second movable lens units and for guiding the movements of the first and second movable lens units; and
   a reference position detector for detecting reference positions for the first and second movable lens units,
   wherein the reference position detector has a light emitting element and a light receiving element,
   wherein the first and second movable lens units have sleeves each engaged with the guide members and have light blocking portions for the reference position detector to detect the reference positions, and
   wherein, in a plane perpendicular to the optical axis, the reference position detector is arranged at a position nearer to the sleeve of the movable lens unit of a higher focus sensitivity than to the sleeve of the movable lens unit of a lower focus sensitivity, where the focus sensitivity represents a ratio of a positional deviation amount of an image plane to a positional deviation amount in the optical axis direction.

7. A lens barrel according to claim 6, wherein, when, in a plane perpendicular to the optical axis, division into four quadrants is effected by a horizontal segment and a vertical segment passing the optical axis, the sleeve of the first movable lens unit and the sleeve of the second movable lens unit are arranged in different quadrants.

8. A lens barrel according to claim 6, further comprising a light amount adjuster for adjusting an amount of light from an object side, wherein the reference position detector is arranged on an image plane side with respect to the light amount adjuster.

9. A lens barrel according to claim 6, wherein the reference position detector is arranged in a quadrant opposed to a quadrant where the first drive source is arranged with respect to a horizontal segment connecting the sleeve of the first movable lens unit and the optical axis.

10. An optical apparatus, comprising:
a lens barrel as claimed in claim 6; and
a camera equipped with an image pickup element receiving light from the lens barrel.

* * * * *